United States Patent [19]

Eggertsen et al.

[11] 4,351,113
[45] Sep. 28, 1982

[54] PRESSURE SENSITIVE ADHESIVELY BACKED DISPOSABLE MEASURING TAPE AND METHOD OF MANUFACTURE

[76] Inventors: Claire C. Eggertsen; John H. Eggertsen, both of 1308 Greenridge, Rochester, Mich. 48063

[21] Appl. No.: 933,461

[22] Filed: Aug. 14, 1978

[51] Int. Cl.³ .............................................. G01B 3/02
[52] U.S. Cl. ................................................. 33/137 R
[58] Field of Search ..................................... 33/137 R

[56] References Cited

U.S. PATENT DOCUMENTS 2,187,087 1/1940 Leary ..................................... 33/194
2,778,113 1/1957 Norman ............................. 33/137 R

FOREIGN PATENT DOCUMENTS 894293 4/1962 United Kingdom ............. 33/137 R

Primary Examiner—Steven L. Stephan
Attorney, Agent, or Firm—Krass, Young & Schivley

[57] ABSTRACT

A pressure sensitive adhesively backed disposable measuring tape which has desirable properties that increase its utility. The tape has a combination of tensile strength, adhesion strength, elasticity and markability which make it desirable for use in common measuring applications.

The tape is manufactured by passing a creped paper adhesively backed tape over a printing drum which has a rubber matte around its periphery. The rubber matte is embossed with a set of false indicia so that as a result of the normal method of mounting on the outer surface of the drum the outer surface of the matte indicates and prints a correct set of indicia on a creped paper tape.

3 Claims, 6 Drawing Figures

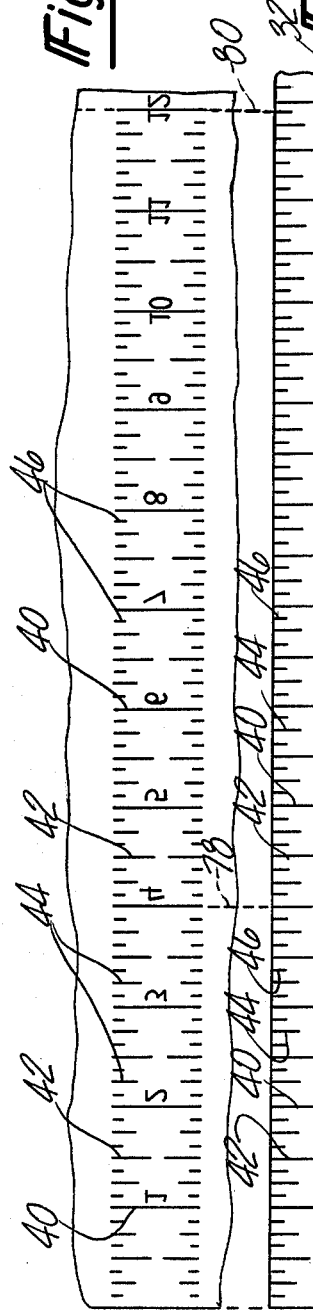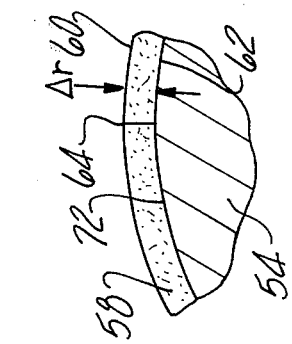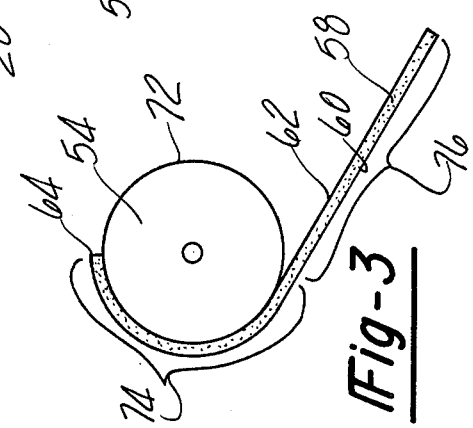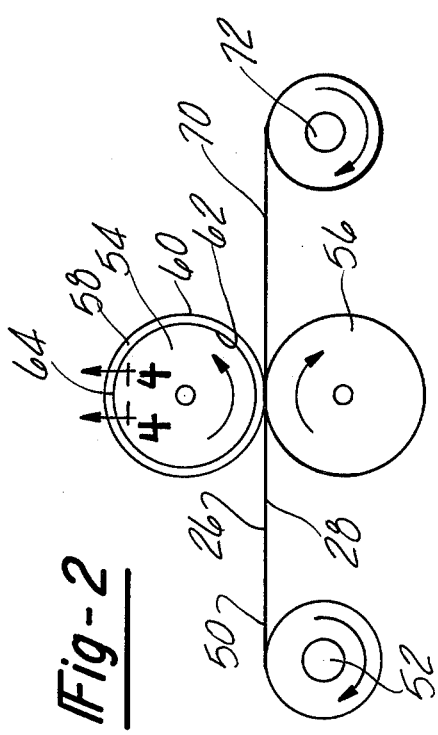

PRESSURE SENSITIVE ADHESIVELY BACKED DISPOSABLE MEASURING TAPE AND METHOD OF MANUFACTURE

BACKGROUND OF THE INVENTION

1. Field of the Invention

The pressure sensitive adhesively backed disposable measuring tape and a method of manufacture.

2. Description of the Prior Art

Since the advent of standardized lengths, measuring tapes have found a myriad of uses. Flexibility of the measuring instrument permits portability of a device that can measure large lengths.

Applying a coating of a pressure sensitive adhesive to the back of the measuring tape permits many new uses. The use of a conventional measuring tape to measure much more than five feet requires two individuals, one at each end, to hold the tape straight and taut. Inaccuracies are introduced, for example, when measuring in a horizontal direction on a vertical surface such as a wall, because of the inevitable sag in the center of the suspended tape. With an adhesively backed tape one fastens the tape to the object being measured as he moves along its surface. The second reson is not required since the tape is attached to the surface being measured. There is no sagging due to weight because the tape is supported by its attachment to the surface along its length.

In many of the uses for which a ruler or yardstick is inappropriate, a longer, adhesively backed tape is the answer. One illustrative example which will be discussed in length is the use of an adhesively backed measuring tape as a stud finder. In the construction of buildings, walls are generally composed of either gypsum board or wet plaster fastened to vertical 2×4 studs. These studs are spaced sixteen inches apart, center to center. One wishing to attach a structure such as shelves or a cabinet to the wall must fasten the structure to the studs to gain secure support. Once one of the studs in the wall is found it is a simple matter to measure in multiples of sixteen inches from that stud to find all of the other studs in the wall.

The properties of adhesively backed measuring tapes can be described using a number of technical terms and criteria. Available adhesively backed measuring tapes exhibit both desirable and undesirable characteristics under these criteria.

Accuracy: One currently available adhesive backed measuring tape achieves accuracy by use of a high modulus plastic tape, i.e. tape of such character that it does not stretch under the forces normally applied during application. For example, in the stud finding problem, one may wish to measure a distance of more than eight feet. If there is a one percent error in the accuracy of the measuring device at least some of the fasteners driven into the wall might miss the studs even though the original stud had been accurately located.

Tensile strength: for ease of use, an adhesively backed measuring tape should be tearable by a user of ordinary strength who is holding one side of the tape with a single finger against the surface to which it adheres and has the roll tape in his other hand. The use of the tool such as a sharp knife or scissors to cut the tape is inconvenient because the tool must be carried on the person in order to be within reach and it must be handled with one hand while the other hand holds the tape roll.

The plastic tape mentioned above achieves dimensional stability by the use of a high modulus plastic base. A concurrent property with the high modulus is a high tensile strength. The plastic tape sacrifices ease of tearing to gain higher accuracy. As a result the tape is difficult to tear and many users must use a tool of some sort in order to cut the pieces.

Adhesion strength: A desirable adhesively backed measuring tape must adhere to the surface to which it is applied so that as parts of it are lifted in order to obtain a true straight line, the whole tape will not peel from the surface. However, there must not be so tight a bond that it is difficult to remove the tape after use or that it requires too much stress to remove the tape from the roll.

Markability: The surface of an adhesively backed measuring tape from which one reads the indicia should be readily markable. This greatly facilitates its use, for example, as a stud finder, where it is not already marked in graduations of sixteen inches. Because people do not always nave the perfect marking tool on their persons, the tape should be able to accept a wide variety of writing media such as pencils, crayons and porous tipped marking pens. The plastic tape mentioned above scores poorly in this regard. Almost anything written on its surface smudges easily, assuming one can make a mark at all.

Elasticity: An adhesively backed measuring tape should adhere to a slightly irregular surface without losing its capability to lay in a straight line. The tape cannot be accurate if it cannot be laid in a straight line. The problem occurs when the unevenness lies in a direction transverse to the one being measured. As the tape is twisted in the transverse direction, there is a tendency for the tape to gradually change direction as it is laid. This occurs because as one presses the tape against the wall, one edge of the tape must travel further than the other. The tape turns in the direction of the edge which deviates farthest from the flat plane of the wall. The high modulus plastic tape suffers severely from this tendency. The high modulus is the opposite to elasticity. As a result when the plastic tape encounters an irregularity it deviates from a straight line as laid or if forced into a straight line, will form a wrinkle.

Cost: In order to enjoy widest use, an adhesively backed measuring tape must be inexpensive. Consumers are unwilling to pay a high cost for a product which is used once and thrown away. Re-use of such a product is undesirable since foreign material is picked up on the adhesive surface and the tackiness of the tape is lost after only a few uses. Also, generally when one cuts the tape to a certain size only by chance will he have a second use for that particular length of tape.

An inexpensive and practical way to print measuring tapes is on a drum printer. The tape is passed between two rolls. The side on which the printing is to appear contacts a drum with a printing matte around its periphery. The matte used is typically composed of rubber. As the rubber matte is placed on the drum, the back side contacts the drum surface and to some extent is compressed. The front side (facing away from the drum) is to some extent stretched. The reason for this is because of the slightly different diameters of the internal surface and the external surface of the matte as it is mounted on the drum. The circumferences of the internal and external surfaces are different. In the flattened configuration they would be the same. If the true measurements are embossed on the rubber matte when flat, this leads to an error of almost one-eighth inch per foot if one uses a matte which is one-sixteenth inch thick and a true twelve inches in length when flat.

In order to prevent stretching or creep of the matte on the drum as the tape is being printed, the matte is mounted on an adhesive surface of the drum. That way each individual portion of the printing surface of the matte is fixedly attached to the periphery of the drum. The adhesive surface is generally provided by a double-sided adhesive tape mounted on the drum.

However, as the matte is mounted, the first portion is generally mounted on the drum with simple pressure and no stretching. As the matte is laid around the circumference of the drum, its external surface exhibits a gap at the juncture of the two-ends of the matte. In order to remedy this the operator will peel off the second half to two-thirds of the matte, stretch it and reapply it. This causes an inconsistency in the size of the subindicia within the extent of the surface of the matte. That is, for example, in dealing with a matte of twelve inches in length, the first four inches applied to the surface of the drum will have the same length as they would have on the matte at rest. However, the last six to inches, because of the stretching phenomenon in the mounting procedure, will have a slightly longer length than they would have on the matte at rest.

SUMMARY OF THE INVENTION

We have invented an inexpensive accurate pressure sensitive adhesively backed disposable measuring tape. This tape is easily torn by hand and is easily removed from surfaces to which it has been applied. It is easily markable because of its rough and absorbant surface and will accept a wide variety of writing media.

The tape of this invention is susceptible to stretching forces and will conform to small irregularities in the surface to which it has been applied, without wrinkling or changing direction. These properties are achieved by the use of a creped paper base for the tape which has a fibrous organic nature.

In the process of making tape according to our invention, the indicia are printed on the top surface of the tape by a rubber matte stretched on a drum. The rubber matte is embossed with a set of false indicia. As the rubber matte is applied in the normal fashion to the drum, the external or printing surface will stretch unevenly so as to form a true set of indicia.

BRIEF DESCRIPTION OF THE DRAWINGS

FIG. 1A is a detail part of the surface of the rubber matte in its flattened condition.

FIG. 1B is a depiction of the tape as it is printed.

FIG. 1C is a depiction of the tape as it would be applied to a surface.

FIG. 2 is a schematic diagram of the printing process.

FIG. 3 depicts the printing drum as the printing matte is being applied to it.

FIG. 4 is a detailed section taken along 4—4 of FIG. 2.

DETAILED DESCRIPTION OF THE ILLUSTRATIVE EMBODIMENT

I. The Tape Structure

The tape of this invention has a creped paper base. The fibrous organic nature of the paper is responsible for many of its properties. The paper is given a smooth crepe finish in a process well known to those skilled in the art. The tape is ¾" wide and has a pressure sensitive adhesive backing also well known to those skilled in the art. The tape is chemically treated to allow printing and is commercially available.

Indicia are printed on the tape on the side opposite the pressure sensitive adhesive. The paper base of the tape is yellow in color and the printed characters are black to enhance visibility. In the specific example shown in FIGS. 1B and 1C inch markings 40 are numerated one through twelve and the cycle repeats. Other gradulations and repeating cycles (for example millimeters and meters respectively) are considered within the scope of this patent, however. The inches are divided by subindicia which indicate half 42, quarter 44 and eighth 46 inches.

The physical structure of the tape described above gives it a tensile strength of approximately fifteen pounds. That is, it takes a force of approximately fifteen pounds in a longitudinal direction to tear the tape. We have found that a tensile strength less than twenty pounds is desirable in order to facilitate use. A higher tensile strength makes for difficult tearing of the tape, and some sort of a cutting tool must be used. Because of the creped paper base of the tape of this invention, virtually any marking tool can be used. The roughness of the surface provides enough abrasion to abrade material like pencil lead and crayons. It also provides enough friction to allow marking by ball point pens. The ink from felt and nylon tip marking pens is partially absorbed by the paper and even though it may smear, a recognizable impression remains.

Markability is necessary in order to broaden the uses of the tape. Conventional and inexpensive printing processes will not allow for a myriad of special use markings on the tape. So the user must be able to add his own indicia. In the specific embodiment discussed, the tape is marked in inches up to a foot and then the markings repeat. for short distances the number of feet can be readily determined. However, for longer distances, one may wish to mark the tape in one, three, five or ten foot intervals. Since the tape is supported on the structure it is measuring by its adhesive backing, the user has the ability to move up and down the length of the tape and add the markings at his convenience.

In the stud finding example, one applies the tape to the wall and then finds a single stud and measures and marks in increments of sixteen inches from that spot on the tape. One or two studs can be found generally by looking for nails in the base boards or the seam between two pieces of wall board. Markability broadens the scope of uses to which the tape may be put and because only one set of indicia need be applied to the tape originally, it decreases the production cost of the tape.

A well known and useful property of a creped paper based tapes is a moderate amount of elasticity. This has both its desirable and undesirable consequences. It is desirable that the tape be able to conform to slight irregularities in the surface onto which it is being applied. It should be able to do this without requiring either wrinkling the tape of a change in direction to keep the tape flat on the surface. The tape in this particular embodiment elongates approximately 5% under a stretching force equivalent to its ultimate tensile strength. Such a force would not be applied to the tape under normal circumstances. But with the tape of this embodiment as it is applied over a small irregularity such as a nail head, the part touching the nail head deforms while the balance of the tape retains its proper orientation.

The undesirable consequence of elasticity is lack of dimensional stability. In normal use as the tape is applied, a stretching force is used in order to get the tape to lie flat and lay out in a straight line. This stretching force causes elongation of the tape measurements which is then set into the tape as it sticks to the surface. This elongation set may be compensated for by printing a set of false indicia or length measurements on a tape that is manufactured. Then as the tape is applied it is stretched to a true length.

We have found that typical person applies between twelve and eighteen ounces of stretching force to the tape as it is being applied. In the specific embodiment which we have been discussing, ¾" tape, this is enough to cause a one-half of 1% elongation. Consequently, the tape is printed such that each one foot division is actually only eleven and fifteen sixteenths long, when no longitudinal force is being applied to the tape. The tape as applied indicates very closely to a true foot.

FIGS. 1B and 1C show a comparison of the tape before application (FIG. 1B) and after application (FIG. 1C). Both tapes are ¾" wide. The tape as applied (FIG. 1C) indicates a true foot. (Length dimensions are distorted in order to get the full twelve inches into the drawing). The line 30 indicates where the one foot line 32 would meet the applied tape 20 if they were overlaid. The line 30 strikes the point 34 of the tape which is displaced from the one foot line by one-sixteenth of an inch as shown at 32'. Both FIGS. 1B and 1C have a normal distribution for their indicia. That is, the length between indicia of equal status is the same from one end of the foot to the other. For example, in both figures the distance between the one inch and one and one-half inch marks is the same as the distance between the ten and one-half inch and the eleven inch marks. This would be true for all half inch divisions within each of the two figures.

The tape of this invention is inexpensive and thus disposable after each use. This results from the use of an inexpensive widely available creped paper base tape. This invention also contemplates relatively inexpensive printing process generally used for making labels. The adaptation of this inexpensive process to the making of the measuring tape is discussed below.

II. THE PRINTING OF THE TAPE

FIG. 2 shows the basic printing process that is used. The tape 50 is wound spirally on the roll 52 when received by the printer. It is unrolled and passed between the printing drum 54 and the reaction drum 56. The reaction drum 56 serves to hold the tape 50 against printing matte 58 which has the indicia embossed on its external surface 60. The indicia are printed on the upper surface 26 of the tape which is opposite the lower side 28 which has the adhesive backing. The printed tape 70 is then rolled on the finished roll 72 and is ready for sale.

Often in this process the tape is received in rolls three, six or twelve inches wide. In this case the printing matte 58 contains multiple representations of the tape indicia to print the full width at once. The printed tape is then slit with knives (not shown) and wound up on multiple rolls having the desired width of the tape. In the prototype stage of the applicant's process, three inch wide rolls of tape are printed with four sets of indicia and the tape is slit into four ¾" wide rolls. Other widths would clearly be included within the scope of this invention. This printing process is inexpensive and is currently used in many print shops for the printing of continuous rolls of labels.

The printing matte 58 is composed of elastic, flexible rubber. The indicia are embossed in a photochemical process well known by those skilled in the art. The matte is formed in the flat state. In use, it is wound on the printing drum 54 as shown in FIG. 2. FIG. 4 shows a detail of a matte 58 wound around the printing drum 54. The two ends of the matte meet at the joint 64. The line shown at 64 is straight. However, the configuration of the two ends are generally in some irregular form. But in any case the form of this joint is not critical as long as there is no gap in the external surface 60 of the matte.

A distortion arises by the fact that the matte is produced in a flat condition but is used mounted on the drum. Both the external surface 60 and the internal surface 62 have the same length. Since the matte has a finite thickness designated $\Delta r$ in FIG. 4, it can be seen that, as the matte is wound on the drum, whatever the configuration of the joint 64, the two surfaces of the matte cannot be of the same length. In practice because the matte is flexible, the inner surface 62 experiences compression and the external surface 60 experiences stretching. The relative amounts of compression and stretching are a function of the elasticity of the matte and the method of application.

A second distortion occurs because of the method of application of the matte 58 to the printing drum 54 as shown in FIG. 3. The external surface of the printing drum 72 has a double sided sticky tape applied to it. As the matte 58 is applied to the surface of the drum 72, it adheres to the sticky tape. The operator lays down the first applied section 74 and presses it against the external surface of the drum 72 to get it to adhere. He then takes the second applied section 76 and wraps it around the drum using the first applied section as an anchor to prevent slipping of the matte 58. The first applied section is between ¼ and ½ of the circumference of the printing drum and in general it covers about ⅓ of the surface of the printing drum. The second applied section covers the balance of the length of the printing matte.

The distortion enters because the first applied section 74 has a small stretching force applied to it in the longitudinal or circumferential direction. As the second applied section is brought around, there is stretching in order to prevent the formation of a gap in the external surface of the matte 60 at the joint 64.

These two distortions manifest themselves on any tape that is printed by this process. It, of course, only becomes critical if the resultant tape is used for measuring purposes where accuracy is required. With a drum circumference of just under twelve inches which is a common size, and a matte thickness of one sixteenth inch, we have found that the external surface of the matte stretches one eighth inch. Because of the method of application, we have found that all of this stretch occurs in the second applied section 76. That is, the first applied section 74 will have the same dimensions on the drum 54 as it did when laid flat. The second applied section 76 will have dimensions slightly larger on the drum than when laid flat.

To compensate for this, the printing matte is shortened by one eighth inch as it is formed. This compensation is not the amount that one would theoretically calculate. Sine the $\Delta r$ is one sixteenth inch and if we assume that only the external surface is distorted by stretching, the increase in the circumference of the external surface would be calculated by the formula $\Delta C = \pi 2\Delta$ where $\Delta C$ equals the change in circumference and $\Delta r$ is the thickness of the matte. For a one sixteenth inch thick matte this would be approximately three eighth inches. We have found, though, that the stretching factor is only one eighth inch. This, again, is because there is compression of inner surface 62 of the printing matte 58.

FIG. 1A shows a section of a printing matte with its indicia for printing the tape of FIG. 1B. The first four inches of FIGS. 1A and 1B are the same length as shown by the line 78. The total length of the indicia from the line 78 to the line 80 in FIG. 1A is one eighth inch less than the total length of the indicia in FIG. 1B. We have found, that applying the matte of FIG. 1A to the printing drum 54 by conventional methods, will allow the printing of the tape of the dimensions of FIG. 1B.

This, of course, is one specific example of a solution to the distortion problem. A different solution, or a different amount of shrinking would be necessary if the matte were either thicker or thinner than this example or if it were made of a different material. There is no requirement that the first applied section be at one end. It could be in the center of the matte but this would have to be controlled so as to get uniformly correct indicia on the finished product.

While we have shown and described several embodiments in accordance with the present invention, it is obvious that the same is not limited to, but is susceptible to numerous changes and modifications as known to those skilled in the art, and we, therefore, do not wish to be limited to the details shown and described herein but instead to cover all such changes and modifications as are encompassed by the scope of the appended claims.

The embodiments of the invention in which an exclusive property or privilege is claimed are defined as follows:

1. An adhesively backed tape having measurement indicia printed on a non-adhesive surface thereof and being constructed in the form of an elongate strip of fibrous organic material, creped over its entire length to permit highly localized stretching to conform to slight irregularities in a surface to which the tape may be attached, the strip material having a tensile strength of less than about 20 pounds to permit hand tearing, the adhesive backing having an adhesion strength of between 12 ounces and 24 ounces, and the strip being of such length as to repeat the measurement indicia and to permit rolling into a size which is convenient for manual handling.

2. An adhesively backed tape as defined in claim 1 wherein the measurement indicia is printed in a length which is actually slightly shorter than the indicated measurement, thus to allow for uniform stretching during application of the tape.

3. An adhesively backed tape having measurement indicia printed on a non-adhesive surface thereof and being constructed in the form of an elongate strip of fibrous organic material, creped over its entire length to permit highly localized stretching to conform to slight irregularities in a surface to which the tape may be attached, the strip material having a tensile strength of less than about 20 pounds to permit hand tearing, the adhesive backing having an adhesion strength of between 12 ounces and 24 ounces, the tape being made according to the process which comprises the steps of: preparing a printing mat of the same length as the measurement indicia, which length is actually shorter than the indicated measurement indicia by a small amount, causing the tape to pass over the printing mat continuously to repeatedly and recurringly print the measurement indicia thereon and thereafter roller the tape into a roll of such size and weight as is convenient for manual handling.

* * * * *